United States Patent [19]

Prinkkilä et al.

[11] Patent Number: 4,853,237

[45] Date of Patent: Aug. 1, 1989

[54] FITNESS DRINK POWDER

[75] Inventors: Helena M. Prinkkilä; Esko J. Pajunen, both of Helsinki, Finland

[73] Assignee: Oy Sinebrychoff AB, Helsinki, Finland

[21] Appl. No.: 196,782

[22] Filed: May 18, 1988

Related U.S. Application Data

[63] Continuation of Ser. No. 947,369, Dec. 29, 1986, abandoned.

[30] Foreign Application Priority Data

Oct. 16, 1986 [FI] Finland ................................ 864178

[51] Int. Cl.$^4$ ................................................ A23L 2/00
[52] U.S. Cl. ..................................... 426/590; 424/680; 426/2; 426/74; 514/23; 514/784
[58] Field of Search .............. 426/74, 648, 804, 890, 426/658, 661, 548, 2; 424/153, 149; 514/23, 784

[56] References Cited

U.S. PATENT DOCUMENTS

| | | | |
|---|---|---|---|
| 3,676,553 | 7/1972 | Reynolds | 424/153 |
| 3,766,165 | 10/1973 | Rennhard | 426/548 |
| 3,876,794 | 4/1975 | Rennhard | 426/548 |
| 3,939,289 | 2/1976 | Hornyak et al. | 426/548 |
| 3,946,211 | 3/1976 | Eisenstadt | 426/548 |
| 4,042,684 | 8/1977 | Kahn | 424/153 |
| 4,187,326 | 2/1980 | Sefafino et al. | 426/658 |
| 4,384,005 | 5/1983 | McSweeney | 426/661 |
| 4,529,613 | 7/1985 | Mezzeno | 426/590 |
| 4,592,909 | 6/1986 | Winer | 424/149 |
| 4,619,833 | 10/1986 | Anderson | 426/548 |
| 4,622,233 | 11/1986 | Torres | 426/548 |

FOREIGN PATENT DOCUMENTS 1252781  11/1971  United Kingdom .
2037565   7/1980  United Kingdom .

*Primary Examiner*—Donald E. Czaja
*Assistant Examiner*—Carolyn Paden
*Attorney, Agent, or Firm*—Finnegan, Henderson, Farabow, Garrett & Dunner

[57] ABSTRACT

A fitness drink powder comprising as main ingredients long chain glucose polymer, sodium chloride, sodium bicarbonate, magnesium chloride and fruit acid.

Said fitness drink powder may also contain a sweetener and aromas and colourings.

A drink prepared from said fitness drink powder has a pH of 5.2 to 5.8.

6 Claims, No Drawings

FITNESS DRINK POWDER

This application is a Continuation of application Ser. No. 947,369, filed 12-29-86.

The present invention relates to a fitness drink powder comprising the following main ingredients:

| | |
|---|---|
| long-chain glucose polymer | 60–85% by weight |
| sodium chloride | 0.5–5% " |
| sodium bicarbonate | 10–20% " |
| magnesium chloride | 0.2–3% " |
| fruit acid | 3–16% " |

The pH range of an aqueous solution is within the range 5.2 to 5.8.

The fitness drink powder of the present invention may additionally comprise a sweetener, preferably a dipeptide sold under the trademark Aspartame by G.D. Searle & Company, as well as aromas and colourings. If necessary, an anti-agglomeration agent, such as calcium silicate, magnesium silicate or sodium silicate, is added.

A drink prepared from the fitness drink powder of the invention has a pH of 5.2 to 5.8, and it contains 120 to 300 mmol/l of a long chain glucose polymer (calculated as glucose units), 50 to 150 mmol/l of sodium, 2 to 10 mmol/l of magnesium, 20 to 70 mmol/l of chloride, 20 to 100 mmol/l of bicarbonate and 10 to 30 mmol/l of fruit acid, as well as 50 to 150 mg/l of a sweetener (Aspartame) and small amounts of aromas and colourings. The fruit acid is preferably malic acid; instead of or together with malic acid, e.g. citric acid and/or ascorbic acid may be used.

A specially preferred composition for a ready made fitness drink is the following:

| | |
|---|---|
| long chain glucose polymer (calculated as glucose units) | 170 mmol/l |
| sodium | 70 " |
| magnesium | 5 " |
| chloride | 30 " |
| bicarbonate | 50 " |
| malic acid | 20 " |
| Aspartame | 100 mg/l |
| natural aroma (lemon) | 700 " |
| permissible colourings | 5 " |

The pH of the drink is about 5.5.

The long-chain glucose polymer preferably comprises less than 10% by weight of monosaccharides and disaccharides. A specially preferred glucose polymer is e.g. a maltodextrine sold under the trademark Maltodextriini by Suomen Nestesokeri, a Finnish company. The carbohydrate content of the said maltodextrine is the following:

| | |
|---|---|
| glucose | less than 3% by weight |
| maltose | less than 7% " |
| maltotriose | less than 20% " |
| other polysaccharides | 70 to 95% " |

The starch reaction of the said maltodextrine is negative, and it contains less than 1% by weight of conductivity ash.

The fitness drink has a very pleasant taste.

Known in the art are fitness and sport drinks containing sodium chloride, potassium chloride and phosphates as well as sugars (German Pat. No. 17 67 652, GB Pat. No. 1,541,461 and British Patent Application No. 2,037,565). There are also products on the market that contain sodium chloride, potassium chloride, magnesium chloride and calcium chloride and phosphates as well as sugar and sugar alcohol.

Some of the known fitness and sport drinks are isotonic (e.g. the product of German Pat. No. 17 67 651); most of the current drinks are hypotonic (GB Pat. No. 1,541,461).

It is essential that the water, salts and energy sources contained in such drinks will be available to the body in an optimal manner. Thus the absorption of said ingredients is dependent on the composition of the solution introduced into the intestines. Only small amounts of water and salts are absorbed of isotonic salt solutions. The absorption of water from the intestines is optimal when the salt concentration is 75 to 120 mmol/l and the glucose concentration 60 to 140 mmol/l (1 to 2.5%). When the glucose concentration exceeds 240 mmol/l, the absorption of water is substantially diminished.

The purpose of the energy supply in these drinks is to maintain the level of sugar concentration in blood at a sufficiently high level during physical exertion. Different carbohydrate energy sources perform differently in this respect and also have an effect on the metabolism of the system. When glucose is ingested during physical stress, also the blood glucose level increases the higher and for the longer time the more concentrated the solution is. Ingestion of glucose before or during physical exertion also increases the blood insulin level. As a result therefrom, the lipolysis of the adipose tissue in the body is inhibited and the fatty acid content in blood decreases, which results in depletion of the energy derived from the body fats and, as a consequence, in more rapid consumption of the body carbohydrate storage and the running out thereof, which again causes a fast decrease in blood sugar (hypoglycaemia) and rapid fatigue.

Fitness drinks are typically ingested at short intervals during physical exertion. Also for this reason, it is essential that the carbohydrate energy source contained in the drink comprises a minimum of monosaccharides and disaccharides, less than 10% of the total amount of the carbohydrate, in order for dental caries not to develop. However, a more serious threat than caries is erosion of the teeth, which is dependent on the acidity of the drink as well as the properties of the fruit acid used. The significance of the prevention of dental erosion is of special significance in the fitness drink, since the drink is most often ingested when the mouth is dry and saliva secretion is low, whereby eroding factors, such as the acidity of the drink, are particularly harmful.

The fitness drink powder of the invention is easily dissolved in water and forms a ready made drink for immediate ingestion. The purpose of ingesting the new fitness drink is, during prolonged physical exertion and stress, such as an athletic performance, training and rambling, as well as before and after such activity, to replenish the loss of body fluid and salts caused by the physical exertion and stress and to prevent the fall in blood sugar content, yet not adversely affecting the metabolism or other functions of the body. Furthermore, said drink will pass rapidly from the stomach into the intestines and will thus not produce an unpleasant sensation of fullness subsequent to ingestion. Said drink further has the advantage of not causing dissolution of the tooth enamel and erosion of the teeth even when ingested continually and regularly at short intervals.

The taste of the fitness drink is fresh, and not even repeated ingestion thereof is unpleasant during a strenuous physical performance.

When the composition for the fitness drink powder of the invention was developed, the medical know-how relating to the properties of corresponding drinks was combined in a novel way, complemented by our own research work in essential parts.

Even during prolonged physical stress, the new fitness drink effectively restores the dehydration resulting from sweating. As is known, profuse sweating and the resultant dehydration (2%) impairs the ability of the system to regulate body temperature; greater dehydration (3%) decreases muscular endurance and strength, which cuts down normal performance. Considerable dehydration (over 6%) may even result in fatal complications.

Sweating resulting from strenuous physical exertion and stress may also be related with significant loss of salts, which may be replenished with the fitness drink. Yet sweat contains less salt ions than blood serum, and thus sweating does not cause a decrease in the serum ion content, when body fluid deficiency is restored with drinks having a sufficient salt content.

Physical exertion consumes the energy sources in the body, and as the duration of physical stress is extended, the body carbohydrate storage may be exhausted to such an extent that performance is significantly impaired with resultant fatigue. The carbohydrate obtained from the present fitness drink will pass rapidly into the bloodstream stream and thus save the body carbohydrate storage and postpone the point of fatigue.

Gastric emptying is regulated by the osmoreceptors in the duodenum, and the passing of fluids is influenced by the amount of fluid intake, the quality and properties of the fluid, as well as the condition of the body. It was found that gastric emptying of the fluid is primarily influenced by the salts used in the drink composition, the quality and amount of the carbohydrate constituting the energy source, and the acidity of the drink.

Dilute sodium chloride solutions pass from the stomach significantly faster than mere water. When the sodium chloride content exceeds 150 mmol/l, gastric emptying again begins to become retarded. Many substances, e.g. sorbitol, potassium chloride and calcium chloride, have a disadvantageous effect of retarding gastric emptying.

The acidity of the content of the stomach, i.e. a decrease in the pH, retards gastric emptying as regulated by the osmoreceptors.

Physiological tests and results

1. Passing of drink from stomach into intestines

The test subjects were given the new fitness drink and, as a reference, a drink containing glucose instead of a glucose polymer; the time for gastric emptying was measured. The salt content of the test solutions was unchanged. The amount ingested was 600 ml; the test solution contained a radiotracer, an isotope 99 mTe DTPA, and the gastric emptying of the solution was followed by a gamma camera.

The results are presented in the table below.

| Carbohydrate | Carbohydrate content % | glucose units (mmol/l) | Half-life for gastric emptying (min) |
|---|---|---|---|
| glucose polymer | 10 | 550 | 50 ± 3 |
| glucose polymer | 5 | 280 | 36 ± 4 |
| glucose polymer | 3 | 170 | 22 ± 4 |
| glucose | 3 | 170 | 25 ± 4 |

Glucose is a potent inhibitor of gastrig emptying, and this effect is particularly strong if the amount of glucose in the ingested drink is more than 3% (170 mmol/1). On the other hand, the effect of a long chain sugar compound (glucose polymer) in inhibiting gastric emptying is smaller, i.e. it is more preferable than glucose.

2. Rate of absorption

The test subjects were given the new fitness drink and, as a reference, a drink containing glucose. The content of B-glucose and S-insulin in blood was measured during 0 to 60 minutes.

The results are presented in the table on page 7.

The test results show that when ingesting the fitness drink the top blood glucose levels are achieved appr. 30 minutes after the ingestion of the drink.

Furthermore, the test results show that when the new fitness drink having a glucose polymer as a carbohydrate source is ingested, a higher and more prolonged increase in the blood glucose level is achieved in relation

TABLE

Glucose and insulin content in blood with different carbohydrate sources

| Carbohydrate | Carbohydrate content % | Glucose units (mmol/l) | Blood glucose (mmol/l) Time (min) | | | | | | | Blood insulin (mU/l) Time (min) | | | | | | |
|---|---|---|---|---|---|---|---|---|---|---|---|---|---|---|---|---|
| | | | 0 | 10 | 20 | 28 | 35 | 45 | 60 | 0 | 10 | 20 | 28 | 35 | 45 | 60 |
| glucose polymer | 10 | 550 | 4.7 | 6.0 | 8.0 | 8.8 | 8.9 | 8.6 | 7.2 | 6 | 20 | 48 | 60 | 66 | 66 | 36 |
| glucose polymer | 5 | 280 | 4.6 | 5.5 | 6.8 | 8.2 | 8.2 | 7.3 | 5.6 | 6 | 18 | 33 | 45 | 39 | 32 | 14 |
| glucose polymer | 3 | 170 | 4.6 | 5.5 | 7.2 | 8.0 | 7.2 | 5.8 | 4.8 | 6 | 14 | 27 | 28 | 21 | 13 | 8 |
| glucose | 3 | 170 | 4.5 | 5.5 | 7.0 | 7.4 | 6.2 | 5.0 | 4.3 | 6 | 21 | 35 | 32 | 21 | 13 | 7 | to the use of glucose, as well as a considerably lower increase in the blood insulin level. The stronger insulin reaction produced by glucose leads to a more intense decrease in the glucose level. In earlier research work it has been shown that the salts used in the new fitness drink also have a lowering effect on the insulin level and an increasing effect on the blood glucose level, compared with a drink in which no salts have been used.

3. Influence on teeth

The eroding influence of fitness drinks on teeth was tested on the basis of the calcium dissolving effect on hydroxyapatite. The pH of the fitness drink samples was regulated to a value between 2.5 and 6.0, and hydroxyapatite was added and the mixtures were incubated for 30 minutes, whereafter the amount of calcium dissolved from hydroxyapatite was determined with an atomic absorption spectrometer.

| pH of the sample | Concentration of dissolved calcium (mmol/l) | |
| --- | --- | --- |
| | Malic acid | Citric acid |
| 2.5 | 5.55 | 5.01 |
| 3.0 | 2.79 | 2.61 |
| 3.5 | 1.60 | 1.45 |
| 4.0 | 0.87 | 0.87 |
| 4.5 | 0.52 | 0.66 |
| 5.0 | 0.32 | 0.50 |
| 5.5 | 0.19 | 0.35 |
| 6.0 | 0.17 | 0.19 |

The test results show that the eroding influence of the new fitness drink on teeth is substantially small when the pH value exceeds 5.0, especially when malic acid is used.

EXAMPLE 1

| Composition of fitness drink Composition of unit portion (2 dl of drink) | | |
| --- | --- | --- |
| Ingredient | Amount (mg) | Content in drink |
| glucose polymer | 6000 | 170 mmol/l |
| sodium chloride | 240 | 20 " |
| sodium bicarbonate | 850 | 50 " |
| magnesium chloride | 100 | 5 " |
| malic acid | 500 | 20 " |
| Aspartame | 20 | 100 mg/l |
| natural aroma (lemon) | 140 | 700 " |
| quinoline yellow | 1 | 5.5 " |
| patent blue | 0.1 | 0.5 " |
| | 7.85 g | |

Preferable to be ingested generally during strenuous, prolonged physical exertion and thereafter.

EXAMPLE 2

| Composition of fitness drink Composition of unit portion (2 dl of drink) | | |
| --- | --- | --- |
| Ingredient | Amount (mg) | Content in drink |
| glucose polymer | 4000 | 115 mmol/l |
| sodium chloride | 60 | 5 " |
| sodium bicarbonate | 1360 | 80 " |
| magnesium chloride | 200 | 10 " |
| malic acid | 1100 | 44 " |

Preferable to be ingested especially after or during physical exertion that involves profuse sweating.

EXAMPLE 3

| Composition of fitness drink Composition of unit portion (2 dl of drink) | | |
| --- | --- | --- |
| Ingredient | Amount (mg) | Content in drink |
| glucose polymer | 10000 | 280 mmol/l |
| sodium chloride | 120 | 10 " |
| sodium bicarbonate | 1360 | 80 " |
| magnesium chloride | 100 | 10 " |
| malic acid | 1100 | 44 " |

Preferable to be ingested during severe physical stress.

What is claimed is:

1. A drink powder which when dissolved in water forms a drink for replenishing body fluids and salts lost by physical exertion and stress, which powder consists essentially of

| maltodextrine | 60–85% by weight |
| --- | --- |
| sodium chloride | 0.5–5% by weight |
| sodium bicarbonate | 10–20% by weight |
| magnesium chloride | 0.2–3% by weight |
| malic acid | 3–16% by weight | which powder, when dissolved in water, provides an aqueous solution having a pH value of 5.2 to 5.8, and when said solution is ingested does not cause dissolution of tooth enamel or erosion of the teeth, does not inhibit gastric emptying, and permits a high and prolonged increase in blood glucose and a low increase in blood insulin level.

2. The drink powder of claim 1, wherein a unit of the powder, used for the preparation of 2 dl of drink, by dissolving in water, contains

| maltodextrine | 4–10 g |
| --- | --- |
| sodium chloride | 170–510 mg |
| sodium bicarbonate | 600–1800 mg |
| magnesium chloride | 40–200 mg |
| malic acid | 350–1250 mg |
| aspartame | 5–150 mg |
| natural lemon aroma | 50–300 mg. |

3. The drink powder of claim 1, wherein a unit portion of the powder, used for the preparation of 2 dl of drink, by dissolving in water, contains

| maltodextrine | 6000 mg |
| --- | --- |
| sodium chloride | 240 mg |
| sodium bicarbonate | 850 mg |
| magnesium chloride | 100 mg |
| malic acid | 500 mg |
| aspartame | 20 mg |
| natural lemon aroma | 140 mg |
| quinoline yellow | 1 mg |
| patent blue | 1.0 mg. |

4. A drink for replenishing body fluids and salts lost by physical exertion and stress which drink consists essentially of an aqueous solution of the following main ingredients in the indicated amounts:

| maltodextrine | 120–300 mmol/l |
| --- | --- |
| sodium | 50–150 mmol/l |
| magnesium | 2–10 mmol/l |
| chloride | 20–70 mmol/l |
| bicarbonate | 20–100 mmol/l |
| malic acid | 10–30 mmol/l, | said drink having a pH of 5.2 to 5.8, and which when ingested does not cause dissolution of tooth enamel or erosion of the teeth, permits carbohydrates in the drink to pass rapidly into the blood stream, does not inhibit gastric emptying, and permits a high and prolonged increase in blood glucose level and a low increase in blood insulin level.

5. The drink of claim 4, wherein said drink contains 50–150 mg/l of aspartame.

6. The drink of claim 4, wherein the preferable composition of the main ingredients is

| maltodextrine | 170 mmol/l |
| --- | --- |
| sodium | 70 mmol/l |
| magnesium | 5 mmol/l |
| chloride | 30 mmol/l |
| bicarbonate | 50 mmol/l |
| malic acid | 20 mmol/l |
| aspartame | 100 mmol/l |
| natural lemon aroma | 700 mmol/l |
| quinoline yellow | 5 mg/g |
| patent blue | 0.5 mg/l. |

* * * * *